(12) United States Patent
Bhattacharya et al.

(10) Patent No.: US 6,866,880 B2
(45) Date of Patent: Mar. 15, 2005

(54) CEREAL GRIT FOOD PRODUCT HAVING ENHANCED SHELFLIFE AND HIGH PROTEIN CONTENT

(75) Inventors: Suvendu Bhattacharya, Mysore (IN); Rangasamy Baby Latha, Mysore (IN); Thotadamoole Ramesh, Mysore (IN); Appu Rao Appu Rao Gopala Rao, Mysore (IN); Vishweshwariah Prakash, Mysore (IN)

(73) Assignee: Council of Scientific and Industrial Research, New Delhi (IN)

( * ) Notice: Subject to any disclaimer, the term of this patent is extended or adjusted under 35 U.S.C. 154(b) by 328 days.

(21) Appl. No.: 10/105,879

(22) Filed: Mar. 25, 2002

(65) Prior Publication Data

US 2003/0180437 A1 Sep. 25, 2003

(51) Int. Cl.$^7$ .................. A23L 1/0562; A23L 1/182
(52) U.S. Cl. .................. 426/622; 426/96; 426/102; 426/103; 426/622; 426/634; 426/640; 426/656
(58) Field of Search .................. 426/622, 640, 426/634, 656, 96, 102, 103

(56) References Cited

U.S. PATENT DOCUMENTS

| | | |
|---|---|---|
| 3,649,293 A | 3/1972 | Hoer et al. |
| 3,723,407 A | 3/1973 | Miller et al. |
| 3,911,142 A | 10/1975 | Huelskamp et al. |
| 3,952,110 A | 4/1976 | Knight et al. |
| 3,959,500 A | 5/1976 | Bergman |
| 3,976,793 A | 8/1976 | Olson et al. |
| 4,044,157 A | 8/1977 | Wilding |
| 4,084,016 A | 4/1978 | Kon et al. |
| 4,119,734 A | 10/1978 | Spiel |
| 4,126,705 A | 11/1978 | Hait |
| 4,183,966 A | 1/1980 | Mickle et al. |
| 4,778,690 A | 10/1988 | Sadel, Jr. et al. |
| 4,891,238 A | 1/1990 | Kurokawa et al. |
| 5,437,885 A | 8/1995 | Lusas et al. |
| 5,595,777 A | 1/1997 | Chalupa et al. |
| 5,612,074 A | 3/1997 | Leach |
| 5,731,019 A | 3/1998 | Schafer et al. |
| 5,753,286 A | 5/1998 | Higgins |
| 5,972,399 A | 10/1999 | Lapre et al. |
| 6,610,335 B2 * | 8/2003 | Hansa et al. .................. 426/93 |

FOREIGN PATENT DOCUMENTS

| | | |
|---|---|---|
| JP | 3015356 | 1/1991 |
| JP | 11113521 | 4/1999 |
| JP | 2000004818 | 1/2000 |

* cited by examiner

*Primary Examiner*—Helen Pratt
(74) *Attorney, Agent, or Firm*—Dority & Manning, P.A.

(57) ABSTRACT

The present invention provides a cereal based protein rich product having good texture and taste and having an enhanced shelf life; the present invention also provides a process for the production of the cereal product.

27 Claims, 2 Drawing Sheets

Flow chart for the development of coated cereal-soy grit

Figure 1. Flow chart for the development of coated cereal-soy grit
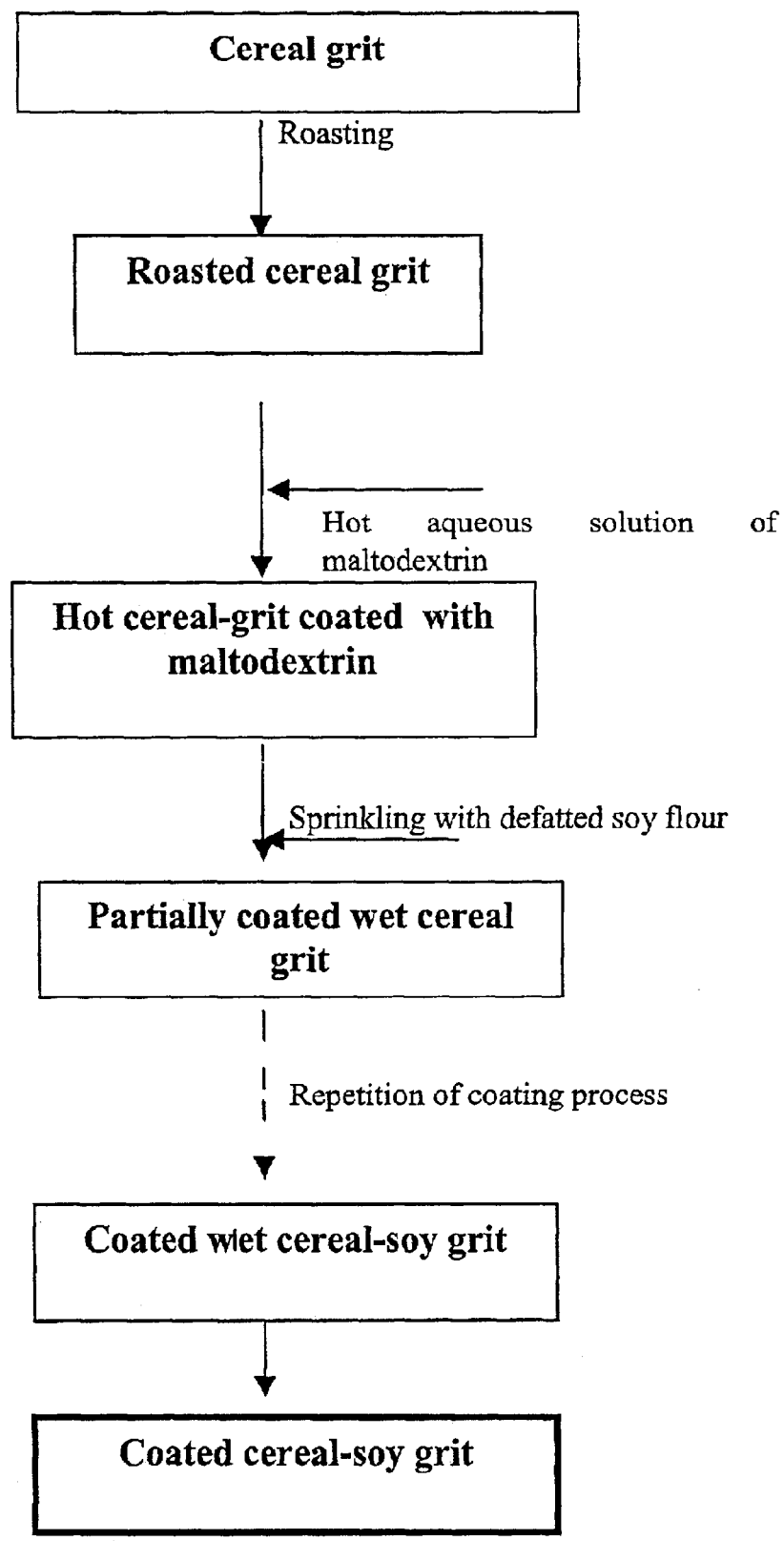

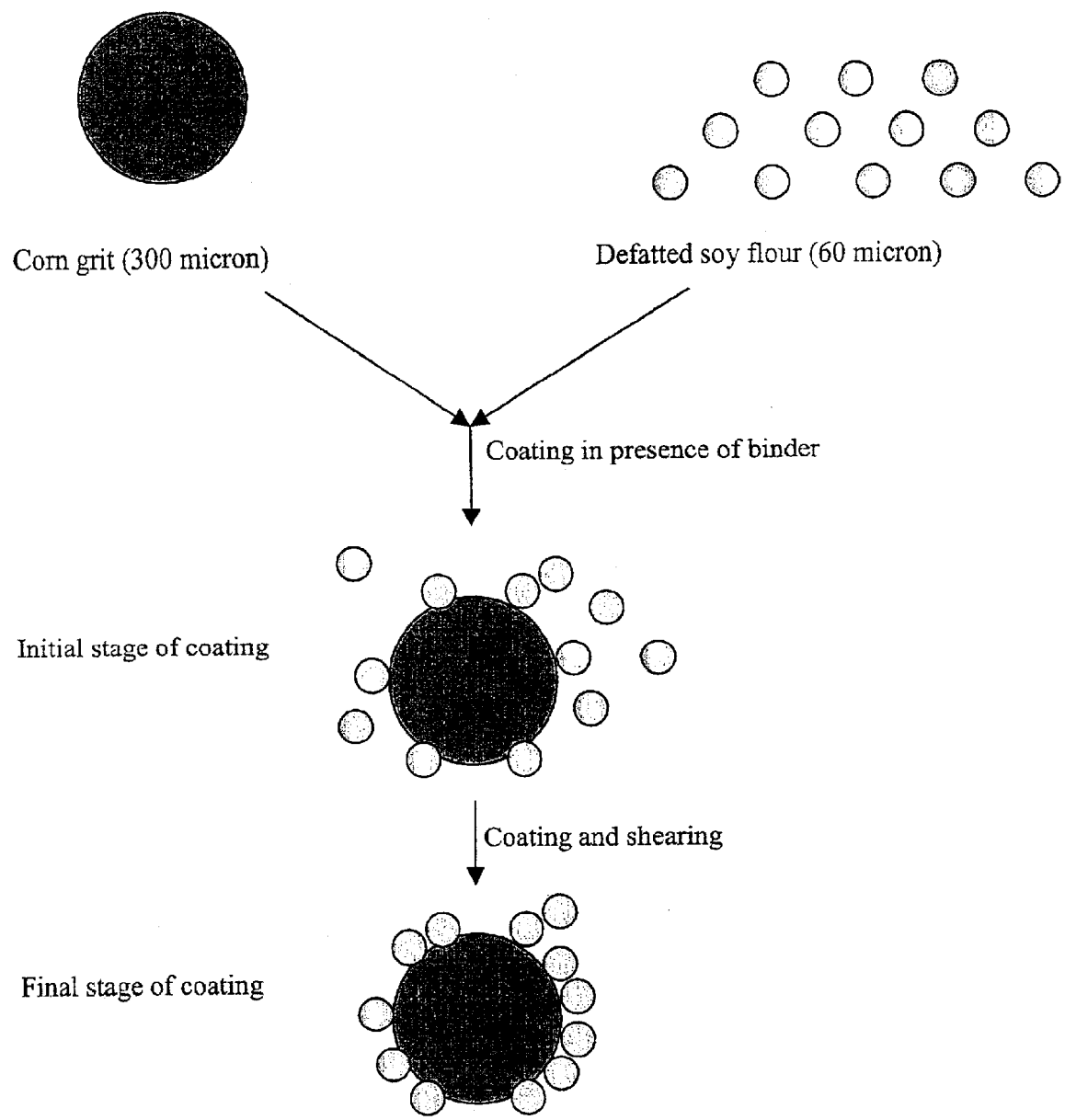
Figure 2. A mechanism for coating of corn grit with soy flour

CEREAL GRIT FOOD PRODUCT HAVING ENHANCED SHELFLIFE AND HIGH PROTEIN CONTENT

FIELD OF INVENTION

The present invention relates to a process for high protein coated ready-to-prepare convenience food products. The present invention also relates to a process for the production of said cereal products.

BACKGROUND AND PRIOR ART REFERENCES

Similar products are commercially manufactured following usually a number of thermal processing system(s). These processes include drum drying, extrusion technology, toasting/roasting, gun puffing etc. where the products attain a low moisture content for safe storage and are easily digested.

Through years of efforts accompanied by changes and improvements, traditional food products became a matter of proud. Traditional food products are preferred by most of the people because of product familiarity, known taste, attractive texture, and in several cases it is just a traditional item.

However, traditional foods can be used as a 'carrier of nutritional ingredients' provided they do not alter or affect the popular acceptance of such products. In Oriental countries, the semolina of wheat is used in preparing a sweet product like halwa (sweet dish) or kesari bhath or sweet soji (savory dishes) and a salty product like upmav (breakfast savory dish), whereas rice flour is used for making gruel or porridge-like products.

Porridge is also popular traditional product in the continents of Europe and America. Corn or maize is popular in several continents particularly Europe, Africa and America continents for making a large number of food products including snacks and different convenience foods. Corn is also been cultivated to a certain extent in India but is still considered to be a low-cost cereal. Except for corn oil, the other ingredients derived from it, such as, corn grit, flour and powder are typically underutilized low-cost material that are not only available in abundant but also cheaper compared to other popular cereals such as rice and wheat.

Soybean or soyabean is a commodity known for its high protein content and other health benefits. On the other hand, defatted soybean flour, obtained after the extraction of valuable oil, is an under utilised low-cost raw material though its protein content is nearly half of the ingredient itself. Though several researchers have focussed on the use of this high-protein plant source ingredient, it is still a neglected item but possesses a promising future. A few products, made from soy flour, that have some popularity include textured soy protein by employing extrusion technology, traditional Asian product tofu or soybean curd by using fermentation, and several fortified foods like bread, biscuit etc.

Hence, there is a need for developing high-protein food by using commonly available ingredients that will not only be cost-effective but also provide convenience, possibly in a ready-to-cook form, to the consumers such that it can be used in nutritional intervention programme and can be consumed as a health food.

Several approaches for the utilization of soybean and soybean fractions are possible. Protein based foods having low cost of production are often formulated using defatted oilseeds (such as soybean) and a cereal.

Extrusion markedly improves the nutritional availability of the ingredients of the product by inactivating the anti-nutritional factors and facilitating easier digestibility (Furuichi, Y., Kubota, Y., Sugiura, Y., Umekawa, H., Takahashi, T and Kouno, S. 1989. Effects of low-moisture extrusion cooking on the chemical composition and nutritional value of whole soybeans. Journal of Japanese Society of Nutrition and Food Science 42(2), 165–172; Guzman, G. J., Murphy, P. A. and Johnson, L. A. 1989. Properties of soybean-corn mixtures processed by low-cost extrusion. Journal of Food Science, 54(6), 1590–1593) which depends on the extrusion conditions (Peters, J., and Czukor, B. 1989. Investigation of the effects of extrusion cooking on antinutritional factors in soybeans employing response surface analysis. II. Effect of extrusion cooking on urease and hemagglutinin activity. Nahrung. 33(8), 729–736). Reference may also be made to Hait (1978, U.S. Pat. No. 4,126,705), and Mickle et al. (1980, U.S. Pat. No. 4,183,966) who have reported processes for manufacturing protein snack foods. The later process also mentioned the application of deep-fat frying to make the snack product.

Reference may also be made on extrusion processes to develop puffed foods having a soft mouth feel when the raw material is egg shell or bone powder, and a predominantly starchy or proteinaceous food material (Kurokawa et al., 1990, U.S. Pat. No. 4,891,238), and also in another example of an extrusion snack (Sadel and Sangiovanni, 1988, U.S. Pat. No. 4,778,690) employing a cereal (corn, rice or wheat) and post-extrusion cooking in oil.

The drawbacks of these processes lie in cooking in oil at the later stages which increase cost of product, reduce shelf-life, and above all, the high oil content in the product may not be suitable for its use as a health food where low-fat/oil content is usually desirable.

Reference may be made to the development of textured vegetable protein using extrusion technology (J. Bergman, Process for blended food products, U.S. Pat. No. 3,959,500 in 1976). The product mentioned here (textured vegetable protein) and the present product (coated cereal food) are different in nature and their process of preparation are also different.

Legume chip was developed by K. Samuel and others in 1978 (Preparation of legume chips, U.S. Pat. No. 4,084,016) by first mixing the acidified legume powder with the regular legume powder followed by adding water to the mix to form a paste and then extruding into thin sheets; later, bite-size pieces were cut from thin sheets and are par-fried in edible oil to get legume chip snacks. It is necessary to mention here that the drawbacks of using extrusion technology lie in use of sophisticated equipment. In addition, frying leads to high fat content in the product, which may not be considered good from the health point of view. Further, the cost of the finished product increases whereas shelf life of the product decreases.

Reference may be made U.S. Pat. No. 6,033,696 (2000) wherein claims have been made for a process for coating of extrusion cooked cereals with a sweet tasting slurry. However, the product is for a snack application in which the base is different from the present study. Moreover, the product contains 3–5% of vegetable fat, which is a disadvantage for the product. Further, the ingredients for coating used include fruit/vegetable puree/concentrate, whole milk powder, etc., which are entirely different from the present application.

Fermentation of the soybean is an another approach to develop soybean based food products. Reference may be made to Japanese patent JP004818A2 (K. Konishi, 2000, Ready-to-eat food admixed with soybean-curd refuse and fermented soybean and its production) wherein a claim has been made to develop a soybean-paste soup-like ready-to-eat food in which soybean curd refuse is heated at high temperature followed by fermentation. In an another approach employing fermentation, W. Sugui and S. Toshiyki in 1999 (Fermented soybean having no spornioderm and its production, Japanese patent 11113521A2), the fermented soybeans were modified by heating followed by effusing of sugar component. The drawback of these processes is the use of a high moisture fermentation process where energy-expensive drying process is to be applied to get the final product.

Reference may be made to Japanese patent JP3015356A2 (M. S. K. K. Ishiyama, 1991, Soybean food) wherein claim has been made to obtain a soybean food having a new kind of taste and original flavor. The drawback of this process is use of a high moisture fermentation process where energy expensive drying process is to be applied to get the final dried product.

Reference may be made to U.S. Pat. No. 5,437,885 (Edmund and others, 1995, Method of making a non-porous vegetable protein fiber product) wherein claim has been made for processing a dehulled, defatted oilseed protein, e.g., soybean meal, to produce non-porous meat like fibers, comprises preparing oilseed protein source and water like mixture, extruding the mixture, coating the extruded mixture with an edible oil or fat and then further extruding the oil- or fat-coated fibers. The drawback of this process lie in use of sophisticated costly equipment like extruder, and practicing the extrusion processing two times. Further, the use of oil or fat increases the fat content of the product which may not be a desired condition for producing a health food because the latter foods usually is based on low-calorie/low-fat principle. In addition, use of fat or oil reduces the shelf life of the product as the possibility of rancidity enhances.

Reference may be made to U.S. Pat. No. 3,649,293R (A. Hoer and F. E. Calvert, 1972, A method for producing a bay protein product) in which de-fatted soybean materials were made into an aqueous slurry in a selected range of pH and later precipitating the protein on and into the surfaces of the cellular portion of the soybean material, separating this protein, coated solid material from the liquid carbohydrate portion, forming a second aqueous slurry. Later this slurry was instantaneously heated at a very high temperature under pressure followed by drying the protein coated cellular material. The drawback of this process lie in a number of processing systems in addition to high energy cost for drying aqueous slurry.

Reference may be made to R. D. Olson and R. H. Eifler in 1976 (Breakfast cereal process and product, U.S. Pat. No. 3,976,793) who claimed a process for sugar coated ready-to-eat breakfast cereal flake composed principally of oat and soyflour. It was claimed that enhanced crispness retention and sweetness impact occurs when dilute sweetening syrup was impregnated on the flake surface, which is crystallized thereon so as not to be grossly visible. The process for breakfast cereal is entirely different from the present process. In addition, the claimed process is on a ready-to-eat product and coating on such bigger piece is much easier than coating on grits which are too small and difficult to coat.

Reference may be made to U.S. Pat. No. 4,119,734 (A. Spiel, High protein rice mixture 1978) wherein the particulate soy protein particles were used along with rice grains to produce protein-rice food products. The developed product resembles that of rice. The drawback of this process is the use of high-pressure treatment, which makes the process a batch one.

Reference may be made to U.S. Pat. No. 4,044,157 (M. Wilding, 1977. Process for preparing expanded soybean granules) claimed a process in which a protein food product having an expanded, elongated cellular structure similar to meat is prepared by forming a dough with seed flour. The method consists of heating the dough under pressure followed by extrusion. The drawback of this process lie in use of sophisticated equipment such as extruder and use of high pressure which may be detrimental to the food product. In addition, this type of process is usually a batch processing system and is also a costly one.

Reference may be made to U.S. Pat. No. 5,612,074 (R. L. Leach, 1997. Nutrient fortified food bar) wherein claim was made for a process on nutrient fortified non-cooked food bar having dietary fiber, non-animal protein etc. that has been given a shape of a food bar. The drawback of this process is that the product is an uncooked food with low protein content such that it can not be categorised into protein-rich convenience foods.

Reference may be made to U.S. Pat. No. 3,723,407 (D. M. Miller and M. D. Wilding, Method of preparing vegetable protein concentrates, 1973) wherein vegetable protein concentrates of high viscosity are obtained by using denatured, defatted, vegetable protein source material with an aqueous system, acidifying the said system and subjecting the material to centrifugal speeds and differential pressure effects. The drawback of the process is the maintenance of the very low pH (such as 3.0) such that there is a chance of alteration in the nutritional status especially the basic amino acids in protein molecules and disruption of natural cell structure of the protein bodies.

The reference may be made to U.S. Pat. No. 3,911,142 (1975), wherein a process for preparing a protein snack food was described. A ready-to-eat snack was made from soy protein and potato flakes. After mixing these ingredients with wheat flour to form a mass, it was shaped into pieces followed by baking or frying to produce the desired product. However, it is essentially a wheat product of cookie type and the sequences of processing steps differ from the one presented.

The reference may be made to U.S. Pat. No. 5,731,019 (1998) wherein a coated food product containing a non-starch coating composition had been disclosed. The composition includes oligosaccharides (2–10%), soluble protein (3–12%, vegetable oil (10–60%), emulsion (0–5%) and water (13–85%). The claims are that this coating composition does not contain starch and can be used to from the crumb (one or more layers). The drawback of this composition lie in medium to higher level of added fat and the product is meant for crumb that is different from the present application.

The reference may be made to U.S. Pat. No. 5,972,399 (1999) wherein claims have been made for a process for a ready-to-cook product made up of a cooked and hydrated carbohydrate core, and a cation reduces the core's glycemic response. In a similar manner, U.S. Pat. No. 5,795,606 (1998) claims for a method comprising boiling in an aqueous medium containing cross-linking cation to develop a ready-to-eat food. The disadvantage of this claim is that the product is meant for persons with diabetic problems. In addition, hydrated carbohydrate core, and a cation cross-linked polysccharide coating were used that are different from the present application.

Reference may be made U.S. Pat. No. 3,952,110 (1976) in which claims have made for a dry mix for coating of foods where spices and meats have been used while maintaining the pH between 5.2 and 6.8. The application of this product is different from the present claim. Moreover, maintaining a specific range of pH means adding water to the system which is a drawback for the claimed process.

Reference may be made to U.S. Pat. No. 5,595,777 (1997) in which a claim has been made for a preparing a gel to be coated on food products for developing breaded substances. However, the product as well as the batter constituents is entirely different from the present application.

Reference may be made to U.S. Pat. No. 5,753,286 (1998) wherein claims have been made for the development of a crunchy coating and a process for preparing coated foods. The coating includes a pre-dust that adheres to the water containing gel batter. However, the application of the product as well as the method of application is different from the present application.

It is, thus, concluded that there is a need for high-protein low-cost convenience foods that can be manufactured using simple systems and commonly available ingredients without sacrificing the attractive taste and nutritional benefits such that the same may be used as a health food for several purposes including nutritional intervention programme.

The criterion for such products includes safety, affordable price, acceptable taste, considerable shelf life, attractive texture, and undoubtedly, the proper nutritional balance. In some cases, the protein and/or energy content and convenience in use become critical factors if these foods are considered as a health food or as a food to be used for nutritional intervention programmes.

The objects the present invention thus relates to cereal food product and a process for high protein coated cereal food, which obviates the drawbacks as detailed earlier.

OBJECTS OF THE PRESENT INVENTION

The main object of the present invention is to provide a high protein food product made of cereal grit having an enhanced shelf life.

Another object of the present invention is to provide a cereal food product grit without using permitted food gums including gum arabic and gum tragacanth to have a good binding property since these gums impart a typical undesirable 'gum taste' when the finished product is consumed.

Another object of the present invention is to provide a process for the production of the cereal grit food products.

Yet another object of the present invention is to provide a process for obtaining a high protein food products such that it is attractive to the consumers as a ready-to-cook convenience food.

Further object of the present invention is to develop a product, which can be used in preparing traditional oriental foods such as halwa, kesari bhath, upmav (sweet and savory dishes) or traditional European foods such as porridge.

Yet another object of the present invention is to provide a process wherein cereal grit, though they are too small in size are coated with still smaller particles using an appropriate technology.

Still another object of the present invention is to provide a process without the addition of food gums but with attractive texture, taste and appearance.

SUMMARY OF THE INVENTION

The present invention relates to a process for high protein coated ready-to-prepare convenience food products having enhanced shelf life with taste and appearance. The present invention also relates to a process for the production of said cereal products.

DESCRIPTION OF THE INVENTION

Accordingly, the present invention provides an easy to prepare food product with cereal grit flour of larger particle size, which is coated with a high protein flour having a smaller particle size having and an enhanced shelf life, said cereal food comprising:
  (a) cereal grit 70–80%;
  (b) maltodextrin as a binding agent 7–10%;
  (c) soybean flour 10–20%; and
  (d) protein content 10–20%.

An embodiment of the present invention, wherein the particle size of the cereal grit is in the range of 100–700 microns.

Another embodiment of the present invention, wherein the particle size of high protein flour is in the range of 20–100 microns.

Yet another embodiment of the present invention, wherein the cereal grit is selected from corn, maize, wheat, rice or a combination thereof.

Still another embodiment of the present invention, wherein the binding agent maltodextrin is in the form of a powder dispersed in water, preferably hot water or sugar solutions or mixtures thereof.

Yet another embodiment of the present invention, wherein soyflour is selected from the group consisting of defatted soybean flour, full-fat soybean flour, soy protein concentrates, soy protein isolate or a combination thereof.

Still another embodiment of the present invention, wherein the high protein content is obtained from oil seeds selected from soybean, groundnut, sesame or protein isolates or a combination thereof.

Yet another embodiment of the present invention, wherein the product having a characteristic color of yellow green with a hue or a dominant wavelength in the range of 568 to 572 nm.

Still another embodiment of the present invention, wherein the product has a long shelf life of over eight months without any hygroscopic behaviour.

Further embodiment of the present invention, wherein the product is used as a base medium for making both sweet food items and non-sweet food items.

Still another embodiment of the present invention, wherein the product having uniformly coated surface without any undesirable overgrowth.

Yet another embodiment of the present invention, wherein the coated surface having a strong adhesive strength to bind and retain the soy flour particles.

Still another embodiment of the present invention, wherein the product having no undesirable flavor or taste of soy flour based products.

Yet another embodiment of the present invention, wherein the retention of the moisture level in the finished product is in the range of 3 to 8%.

The present invention also provides a process for the production of an easy to prepare high protein coated cereal grit food product without an addition of food gums and having enhanced shelf life, said process comprising the steps of:
  (a) roasting cereal grits in a conventional roaster at a temperature in the range of 70 to 180° C. for a period of 10 to 80 minutes;
  (b) preparing an aqueous solution of maltodextrin under constant stirring at a temperature in the range of 60–70° C.;

(c) mixing the roasted cereal grits of step(a) with the solution of step(b);

(d) sprinkling protein rich flour; and (e) drying the mix at a temperature of 55 to 65° C. for a period of 60–70 minutes to obtain protein rich cereal grits;

An embodiment of the present invention, a process wherein the cereal grit is selected from corn, maize, wheat, rice or a combination thereof.

Yet another embodiment of the present invention, a process wherein the protein content of the product is in the range of 10 to 20%.

Still another embodiment of the present invention, a process wherein maltodextrin content in the solution of step (b) is in the range of 10–35%.

Further embodiment of the present invention, a process wherein the product having characteristic colour of yellow green with a hue or dominant wavelength in the range of 568 to 572 nm.

Yet another embodiment of the present invention, a process wherein soybean or soybean flours used are defatted soybean flour, full-fat soybean flour, soy protein concentrate and soy protein isolate or a combination thereof.

Still another embodiment of the present invention, a process wherein soybean or soybean flours used have an average particle sizes in the range of 20 to 100 microns.

Yet another embodiment of the present invention, a process wherein roasting is effected using a rotary gram or coffee roaster at a temperature of 700–1800° C. for a period of 10–80 minutes.

Still another embodiment of the present invention, a process wherein the binding agent used is a dispersion of maltodextrin powder in hot water, or sugar solutions and mixtures thereof.

Yet another embodiment of the present invention, a process wherein the coating is effected using a rotary coating pan, coating drum, enrober, ribbon mixer, sigma mixer or spray coating devices for a period of 2–15 minutes.

Still another embodiment of the present invention, wherein the product of the said process having an enhanced shelf life of more than 8 months without showing any hygroscopic behaviour.

Further embodiment of the present invention, a process wherein the roasting is effected using a rotary gram or coffee roaster with adequate temperature control facility.

Still another embodiment of the present invention, a process the binding agent used is a dispersion of maltodextrin powder in hot water, or sugar solutions or similar suspensions and mixtures thereof.

Yet another embodiment of the present invention, a process wherein the coating is effected using a rotary coating pan, coating drum, enrober, ribbon mixer, sigma mixer or spray coating devices.

The present invention is further explained in the form of preferred embodiments:

In the present invention, it has been observed that if non-stationary roasted-cooked grits in hot condition is coated with a warm concentrated solution of maltodextrin in a rotary drum/coating pan/mixer, instantaneous evaporation of water offers a strong adhesion characteristics to the grits. This adhesion is strong enough to bind any particulate food solid(s) such as fine powder of defatted soy flour. The binding is so strong that the coated substance appears as single grit, and does not come out easily during further processing.

The present process and product does not offer any undesirable flavour or taste which is a common problem with almost all the soy-based products. Due to these above mentioned reasons, the fortification level of soy decreases which is avoided in the present invention. The fortification of soy can be up to 20% in the product is possible without any detectable undesirable soy characteristics.

DESCRIPTION OF THE ACCOMPANIED FIGURES

1. The steps adopted in the process of the present invention are depicted in the form of the following flow diagram as shown in FIG. 1.
2. A mechanism of coating corn grit with defatted soy flour or similar materials has been proposed which is outlined in FIG. 2.

Corn grit, being much bigger in size (100–700 micron), needs to be coated with much smaller (20–90 micron) particles of soyabean flour. The maltodextrin solution when put and spread on very hot non-stationery corn grit in a rotary coating device, instantly tries to evaporate leaving behind a sticky surface. The stickiness offered by the maltodextrin is due to the dual action of sugar as well as starchy components as maltodextrin is basically an intermediate between starch and sugar. The sticky surface of maltodextrin-coated corn grit in turn attracts and bind the smaller soybean flour particles. The uniformity of coating surface and overgrowth of soybean surface is undesirable from the point of water absorption as they can act as a water shielding layer. This can be avoided by using the shearing forces that is provided by the rotation of the coating pan or drum and by repletion of the coating process with the application of maltodextrin and soybean particles in simultaneously at several stages. The final product thus possess an uniformly coated surface without undesirable overgrowth but at the same time with a strong adhesive strength that do not allow the coated particles to come out easily.

The following examples are given by way of illustration of the present invention and therefore it should not be construed to limit the scope of the present invention.

EXAMPLE 1

50 kg of corn grit (average particle is size 316 micron) with a moisture and protein content of 7.5% and 8.2%, respectively, passing through a 18 mesh (British standard sieve), was roasted in a rotary coffee roaster for 1 hour. The end point of roasting was selected when the material attains a temperature of 120° C. at which time it was allowed to get roasted for another 10 minutes. 2.63 kg of maltodextrin was dispersed in 4.30 liters of warm (about 60° C.) water by stirring gently to make the coating-cum-binding suspension. 25 kg of hot roasted corn grits were placed in a ribbon mixer and the coating suspension was poured and defatted soyflour (5.26 Kg) were sprinkled alternatively in three stages to get the partially wet corn-soy grits which were later dried in a tray drier at 65° C. for 1 hour. The commercially obtained untoasted defatted soya flour had a protein content of 49.5% and a moisture content of 6.3%. The average particle size of defatted soya flour, as determined by using a particle size analyzer, was 65 micron. The moisture and protein content of the finished product was 6.1% and 15.1%, respectively, and the trypsin inhibitor activity was 7.6 TIU. The colour of the sample, as determined by employing the principle of reflectance of light, was bright yellow-green as it had a brightness of 56.4%, 34.0% chroma and dominant wavelength of 570 nm when measured in a calorimeter.

EXAMPLE 2

5 kg of coarse wheat semolina with a moisture and protein content of 8.3% and 10.3%, respectively, passing through a 18 mesh (British standard sieve) but retained on 24 mesh sieve, was roasted in a rotary coffee roaster for 45 minutes. When the material was about 100° C., it was roasted for another 5 minutes at that temperature. 275 g of maltodextrin was dispersed in 450 ml of warm (about 70° C.) water by stirring gently to make the coating-cum-binding suspension. The hot roasted corn grits were then coated with the above mentioned maltodextrin suspension and 1 kg of toasted defatted soyflour, as mentioned in example 1. The coated grits which were later dried in a tray drier at 65° C. for 1 hour. The developed soycoated wheat grit/semolina had moisture content of 5.8%.

EXAMPLE 3

The corn-soy grits, developed by following the method as described in example 1, was used to prepare different sweets, such as, soji or kesari bath or halwa and rawa laddu (sweet dishes) as described in the following lines. 250 ml of water was boiled in which 100 g of the said corn-soy grit was poured and cooked for another 3 minutes while adding 200 g of powdered sugar and 75 g of hydrogenated fat 1 minute before the end of cooking. Mixing was continued for 2 minutes when a semi-solid viscous mass was obtained with the indication for oil separation, i.e., and no further oil was absorbed. The whole mass was allowed to cool for 5 minutes and served warm. The finished product had an attractive bright yellow colour.

Rava laddu (sweet spherical balls made using the corn-soy grits) was also prepared as described in the following lines. Well known food products prepared from chickpea flour include boondi (spherical shaped deep-fat fried product made from the batter) and laddu. The latter is prepared by making small balls using sugar soaked boondi. Alternatively, laddu is made from toasted wheat semolina (rava). In the present study, 15 g of hydrogenated vegetable fat was heated up to 90° C. to which 500 g of developed soy-corn grit (particle size +24 mesh British Standard sieve) was added and toasted for 2 minutes while using medium flame. To the ground soy-corn grit, 640 g of powdered sugar, 50 g of raisins, 50 g of truity fruity (sweet papaya candy pieces), 200 g of grated copra (dry coconut) and 10 g of powdered cardamom were added and mixed thoroughly. 100 ml of hot milk (about 80° C.) was poured over the mixture and laddus of about 25 mm diameter were formed manually.

The corn-soy grits, developed by following the method as described in example 1, was used to prepare different non-sweet products such as upmav or kara bath as described in the following lines. In a frying pan, 15 g of refined groundnut oil was heated to 90° C. and then 1 g of mustard seed was added to it. When the mustard seeds started cracking due to heating, 20 g of onion pieces, 3 pieces of green chili and 1 g of ginger pieces were added to it as seasoning ingredients. 300 ml of water was boiled in the same pan in which 100 g of the developed corn-soy grit was poured and cooked for another 3 minutes with occasional stirring. A homogeneous mass was obtained in which chopped coriander leaves were garnished. The whole mass was allowed to cool for 5 minutes and served warm. In an another application, 50 gram of developed corn-soy grit (passing through a 24 mesh) and be mixed with 400 gram of boiling water and 100 gram of sugar, and the mix is continued to boil for another 3 minutes. One gram of cardamom powder is added for flavoring, and the prepared porridge is served hot. The reconstitution property of developed grits is excellent and the prepared porridge possess a good taste without any soy flavor.

ADVANTAGES

1. The cereal grit, though they are too small in size, can be coated with still smaller particles such as defatted soy flour using an appropriate technology.
2. Use of commonly available materials and processing equipment.
3. Cost-effective easy-to-adopt processing system for the development of high protein foods.
4. Less time of processing or cooking at the consumers' end.
5. Suitable as a convenience and/or supplementary food for nutritional intervention programme, and for making several foods such as health food, as a breakfast (Ex.upmav, puliogare), as sweets like kesari bath, halwa, keer, rava laddu), as porridge and as speciality foods for patients, sports persons, etc.
6. Quick reconstitution of the developed product prior to further use or consumption.
7. Long shelf-life.

What is claimed is:

1. An easy to prepare food product with cereal grit flour of larger particle size, which is coated with a high protein flour having a smaller particle size having and an enhanced shelf life, said cereal food comprising: (a) cereal grit in an amount of 70–80%; (b) maltodextrin as a binding agent in an amount of 7–10%; (c) soybean flour in an amount of 10–20%; and (d) protein content of 10–20%.

2. A cereal food according to claim 1, wherein the particle size of the cereal grit is in the range of 100–700 microns.

3. A cereal food according to claim 1, wherein the particle size of high protein flour is in the range of 20–100 microns.

4. A cereal food according to claim 1, wherein the cereal grit is selected from corn, maize, wheat, rice or a combination thereof.

5. A cereal food according to claim 1, wherein the binding agent maltodextrin is in the form of a powder dispersed in water.

6. A cereal food according to claim 1, wherein the soybean flour is selected from the group consisting of defatted soybean flour, full-fat soybean flour, soy protein concentrates, soy protein isolate and a combination thereof.

7. A cereal food according to claim 1, wherein the high protein content is obtained from oil seeds selected from soybean, groundnut, sesame or protein isolates or a combination thereof.

8. A cereal food according to claim 1, wherein the product having a characteristic color of yellow green with a hue or a dominant wavelength in the range of 568 to 572 nm.

9. A cereal food according to claim 1, wherein the product has a long shelf life of over eight months without any hygroscopic behaviour.

10. A cereal food according to claim 1, wherein the product is used as a base medium for making both sweet food items and non-sweet food items.

11. A cereal food according to claim 1, wherein the product having uniformly coated surface without any undesirable overgrowth.

12. A cereal food according to claim 1, wherein the coated surface of the cereal grit having a strong adhesive strength to bind and retain the soybean flour.

13. A cereal food according to claim 1, wherein the product having no undesirable flavor or taste of soy flour based products.

14. A cereal food according to claim 1, wherein the retention of the moisture level in the finished product is in the range of 3 to 8%.

15. A process for the production of an easy to prepare high protein coated cereal grit food product without an addition of food gums and having enhanced shelf life, said process comprising the steps of: (a) roasting cereal grits in a conventional roaster at a temperature in the range of 70 to 180° C. for a period of 10 to 80 minutes; (b) preparing an aqueous solution of maltodextrin under constant stirring at a temperature in the range of 60–70° C.; (c) mixing the roasted cereal grits of step (a) with the solution of step (b); (d) sprinkling protein rich flour; and (e) drying the mix at a temperature of 55 to 65° C. for a period of 60–70 minutes to obtain protein rich cereal grits.

16. A process according to claim 15, wherein the cereal grit is selected from corn, maize, wheat, rice or a combination thereof.

17. A process according to claim 15, wherein the protein content of the product is in the range of 10 to 20%.

18. A process according to claim 15, wherein maltodextrin content in the solution of step (b) is in the range of 10–35%.

19. A process according to claim 15, wherein the product having characteristic colour of yellow green with a hue or dominant wavelength in the range of 568 to 572 nm.

20. A process according to claim 15, wherein the protein rich flour is defatted soybean flour, full-fat soybean flour, soy protein concentrate, soy protein isolate or a combination thereof.

21. A process according to claim 15, wherein the protein rich flour has an average particle size in the range of 20 to 100 microns.

22. A process according to claim 15, wherein roasting is effected using a rotary gram or coffee roaster at a temperature of 700–1800° C. for a period of 10–80 minutes.

23. A process according to claim 15, wherein the aqueous solution of maltodextrin is a dispersion of maltodextrin powder in hot water, sugar solution or mixtures thereof.

24. A process according to claim 15, wherein the sprinkling is effected using a rotary coating pan, coating drum, enrober, ribbon mixer, sigma mixer or spray coating devices for a period of 2–15 minutes.

25. A process according to claim 15, wherein the product of the said process having an enhanced shelf life of more than 8 months without showing any hygroscopic behaviour.

26. A process according to claim 15, wherein the roasting is effected using a rotary gram or coffee roaster with adequate temperature control facility.

27. A process according to claim 15, wherein the sprinkling is effected using a rotary coating pan, coating drum, enrober, ribbon mixer, sigma mixer or spray coating device.

* * * * *